(12) United States Patent
Sahlin (10) Patent No.: US 9,363,117 B2
(45) Date of Patent: Jun. 7, 2016

(54) METHOD, BASEBAND SIGNAL GENERATOR AND COMPUTER PROGRAM FOR PROVIDING A BASEBAND SIGNAL

(71) Applicant: Intel IP Corporation, Santa Clara, CA (US)

(72) Inventor: Staffan Sahlin, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/550,412

(22) Filed: Nov. 21, 2014

(65) Prior Publication Data

US 2015/0180690 A1    Jun. 25, 2015

(30) Foreign Application Priority Data

Dec. 23, 2013    (DE) .......................... 10 2013 114 832

(51) Int. Cl.
| | |
|---|---|
| H03C 1/52 | (2006.01) |
| H04L 27/04 | (2006.01) |
| H04L 25/02 | (2006.01) |
| H04J 11/00 | (2006.01) |
| H04L 27/26 | (2006.01) |
| H04L 5/00 | (2006.01) |

(52) U.S. Cl.
CPC .............. *H04L 27/04* (2013.01); *H04J 11/003* (2013.01); *H04L 25/028* (2013.01); *H04L 27/2634* (2013.01); *H04L 5/001* (2013.01)

(58) Field of Classification Search
CPC ..... H04L 27/00; H04L 27/04; H04L 27/2602; H04L 27/361; H04L 1/0003; H04L 1/0071; H04L 5/0007; H04L 1/0009; H04L 27/0008; H03F 3/24

USPC .......................................... 375/300, 295, 219
See application file for complete search history.

(56) References Cited

U.S. PATENT DOCUMENTS

| | | | | |
|---|---|---|---|---|
| 2005/0281360 | A1* | 12/2005 | Booth et al. .................. | 375/346 |
| 2011/0116535 | A1* | 5/2011 | Mori et al. .................... | 375/224 |

OTHER PUBLICATIONS

"Germany Application Serial No. 102013114832.8, Office Action Mailed Aug. 7, 2014", W/ English Translation, 11 pgs.
Chauhan, Malhar, et al., "Different Techniques to Reduce the PAPR in OFDM System", International Journal of Engineering Research and Applications (IJERA), 2(3), (2012), 1292-1294.
Jiang, Tao, et al., "An Overview: Peak-to-Average Power Ratio Reduction Techniques for OFDM Signals", IEEE Transactions on Broadcasting 54(2), (Jun. 2008), 257-268.

* cited by examiner

*Primary Examiner* — Zewdu Kassa
(74) *Attorney, Agent, or Firm* — Schwegman Lundberg & Woessner, P.A.

(57) ABSTRACT

A method (100) for providing a baseband signal comprises monitoring (102) a disparity between a first magnitude of a first signal component (202) and a second magnitude of a second signal (204) component. If the disparity is below a threshold, the first signal component (202), the second signal component (204) or a combination of the first signal component (202) and the second signal component (204) is modified to provide a first modified signal component and a second modified signal component to increase the disparity between the magnitudes of the modified signal components above the threshold. The first modified signal component (202) and the second modified signal component (204) are combined to provide the baseband signal.

18 Claims, 5 Drawing Sheets

METHOD, BASEBAND SIGNAL GENERATOR AND COMPUTER PROGRAM FOR PROVIDING A BASEBAND SIGNAL

PRIORITY APPLICATION

This application claims the benefit of priority to German Application No. 102013114832.8, filed Dec. 23, 2013, which is incorporated herein by reference in its entirety.

FIELD

Examples relate to a method, a baseband signal generator and an apparatus for providing a baseband signal.

BACKGROUND

Multiple wireless transmission systems, as for example LTE mobile telecommunication systems and wireless fidelity (WiFi) systems transmit information provided or generated at an intermediate or baseband frequency by modulating the information or the baseband signal onto a high frequency carrier. While some approaches use baseband signals comprising a single signal component, i.e. a single stream of information to be transmitted by a single signal component associated to a carrier frequency, further approaches transmit two streams of information at a time. In order to be able to reconstruct the different information streams at a receiver side, the first information stream can be submitted using a first frequency resource and the second information stream can be submitted using a second frequency resource. When using a single transmitter to transmit both information streams, a baseband signal may be generated which comprises a first signal component associated to the first frequency and a second signal component associated to the second frequency. The first signal component comprises information about the first data stream and the second signal component comprises information of the second data stream.

Generating a baseband signal comprising a first signal component associated to a first frequency and a second signal component associated to a second frequency, however, may result with signals generating additional noise components due to, for example, a nonrandom appearance of signal disturbances or other characteristics leading to undesirable properties of the transmitted signal. Also disturbances close to the center frequency of the transmitted signal may disturb other frequency resources of the transmission system to an undesirable or unacceptable extent.

There is a desire to provide alternative ways to provide a baseband signal comprising a signal component associated to a first frequency as well as a signal component associated to a second frequency.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some examples thereof are shown by way of example in the figures and will herein be described in detail. It should be understood, however, that there is no intent to limit examples to the particular forms disclosed, but on the contrary, further examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular examples only and is not intended to be limiting of further examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
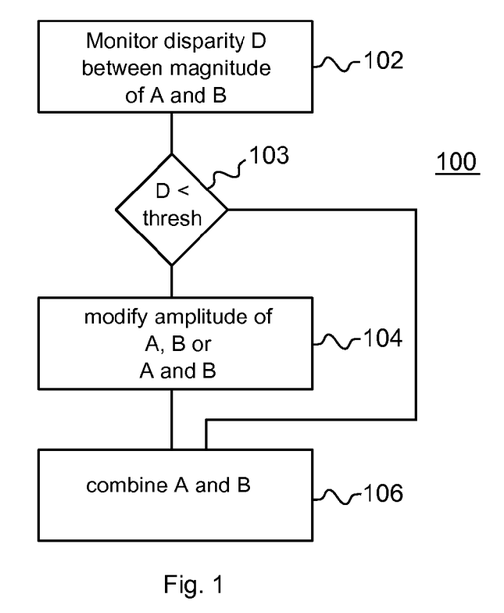
FIG. 1 illustrates an example of a method for providing a baseband signal by means of a block diagram.

FIG. 1 illustrates an example of a method for providing a baseband signal comprising at least a first signal component A(t) and a second signal component B(t). The first signal component A(t) is associated to a first frequency and the second signal component B(t) is associated to a second frequency. The method comprises monitoring (102) a disparity measure between a first magnitude of the first signal component and a second magnitude of the second signal component. The disparity measure may, for example, be a ratio or a difference between the magnitude of the first signal component and the second signal component. The method then continues to step 103 to determine if the disparity measure is below a threshold. If the disparity measure is within an undesirable domain so that it falls below a predetermined threshold, the method continues to step 104 to modify the first signal component, the second signal component or a combination of the first signal component and the second signal component to increase the disparity between the magnitudes of the modified signal components above the threshold.

The method further comprises step 106 to combine the first modified signal component and the second modified signal component to provide a baseband signal. This may allow that both the first and second signal components are transmitted by means of a single transmitter. Referring to step 104, modifying the first signal component, the second signal component or a combination of the first signal component and the second signal component to provide a first modified signal component and a second modified signal component may be performed by modifying only one of signal components at a time or by modifying both the first signal component and the second signal component simultaneously. Irrespective of whether only one or both signal components are modified, the signal components are denoted first modified signal component and second modified signal component within the time interval in which the magnitudes of the first signal component and the second signal component would have a disparity above the threshold without the modification of the first signal component, the second signal component or a combination of the first signal component and the second signal component.

According to some examples, the first and second signal components may be complex valued time dependent signals, for example in mobile telecommunication applications. The signal components may be time continuous or represented by a series of discrete complex values. According to some examples, the modified signal components may be added. According to further examples, however, combining may comprise further processing steps, such as for example filtering, scaling, frequency shifting or the like. According to a particular example, the modified signal components are individually filtered, subsequently frequency shifted and scaled before they are added to provide an LTE compliant baseband signal.

In the example illustrated in FIG. 1, in step 103, if a ratio between the first magnitude and the second magnitude is above the threshold, the first and second signal components may be combined unmodified. By modifying at least one signal component such that a minimum distance or ratio between the magnitudes of the modified or unmodified signal components is maintained or provided, it may be avoided that the combination of two signal components associated to different frequencies results with undesirable signal properties of the baseband signal obtained. For example, it may be avoided that additional noise components are introduced which occur at regular time intervals and, therefore, would cause additional noise or disturbance to the spectrum of the generated baseband signal. While some signal processing and transmitting techniques perform manipulations or modifications to the individual signal components in the frequency domain as well as in the time domain, it should be noted that the modification of the at least one magnitude of the first magnitude and the second magnitude of the associated signal components can be performed in either one of the domains or in both of the domains. A modification in the frequency domain translates directly into a corresponding change of the characteristic of the signal in the time domain and vice-versa.

While only one signal component is modified in some examples, further examples may modify both signal component at a time. According to some examples, the first signal component and the second signal component are modified by an identical amount, for example if both signal components are equally important according to some arbitrary criterion.

According to further examples, however, only one signal component is modified while the other signal component remains unmodified. This may serve to avoid the modification of signal characteristics in the event that the unmodified signal component is more important than the other signal component. Modifying only one signal component may be performed when additional throughput criteria have to be met so as to, for example, maintain the signal component having associated thereto the higher data rate unmodified while a modification of the other signal component may be affordable. This may, for example, be the case in mobile telecommunication systems where a higher modulation is used for the unmodified signal component and where a lower and more robust modulation scheme is used for the second signal component to be modified.

According to some examples, it may be decided that a primary component carrier and its associated signal component is not modified, while only the signal component corresponding to a secondary component carrier of an LTE signal is modified in order to ensure that the signal characteristic of the primary component carrier is maintained. While FIG. 1 illustrates by means of a flowchart as to how a baseband signal comprising two signal components may be generated without causing additional undesirable noise or spectral components (spurious), FIG. 2 illustrates one particular example as to how the modification may be performed and FIG. 3 illustrates how the introduction of additional noise or spurious into a baseband signal occurs if a modification according to the examples described herein is not performed and conventional approach is used instead.

Figure 2:
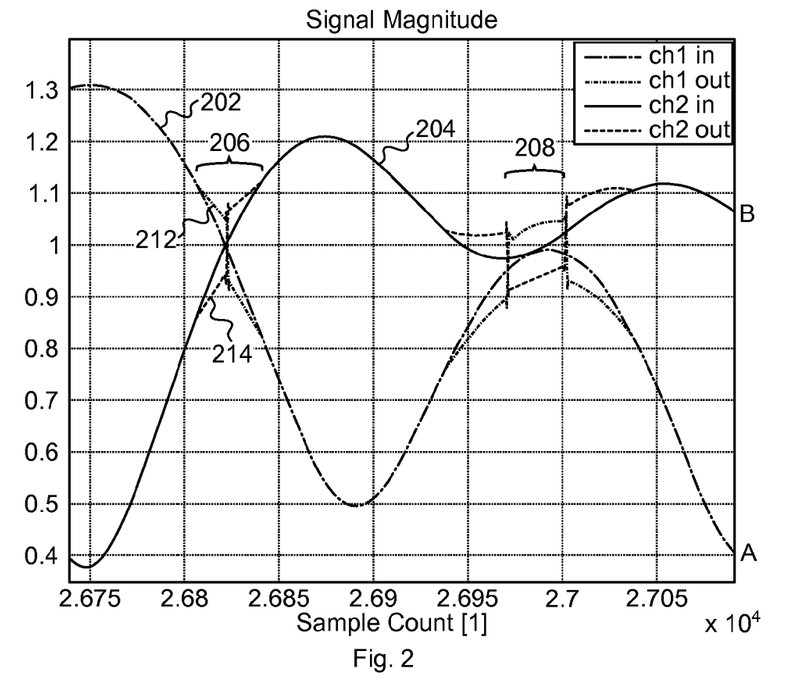
FIG. 2 illustrates examples for the magnitudes of a first signal component and a second signal component as generated or provided by an example as described herein.
Figure 3:
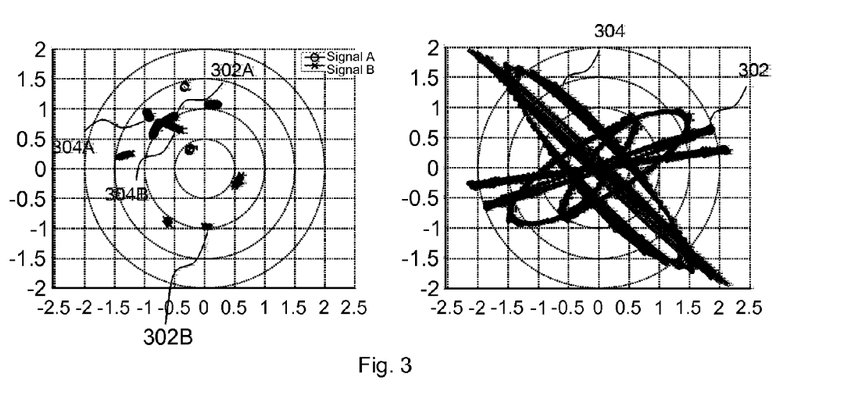
FIG. 3 illustrates examples for signal components to be combined and their resultant baseband signals according to previous approaches.

FIG. 2 illustrates a diagram showing the temporal evolution of a first magnitude 202 of a complex valued first signal component and of a second magnitude 204 of a complex valued second signal component. The x-axis of the graph illustrated in FIG. 2 shows the time in arbitrary units, in particular, by means of sample numbers. The y-axis illustrates the first magnitude 202 (A) of the first signal component and the second magnitude (204) B of the second signal component in arbitrary units. That is, the absolute values of first and second signal components and are illustrated, disregarding the phase of the signal.

According to the example illustrated in FIG. 2, the first and second signal components are modified by the same amount so that the magnitude A and the second magnitude B are also modified to the same extent. According to the method for providing a baseband signal, a disparity measure between the first magnitude A and the second magnitude B is monitored. If the disparity measure would fall below a threshold, the first signal component and the second signal component are modified so that the disparity of the modified magnitude are above the threshold. An example of the method is summarized within the following pseudo-code, indicating that the monitored disparity in this particular example is a ratio between the magnitudes A and B. A ratio between the signal magnitudes is one particular way to describe a disparity between the magnitudes. A further example may alternatively use the difference in mathematical terms, i.e., a difference $D=A-B$, while the example in FIG. 2 uses a disparity measure based on a ratio $R=A/B$ between the magnitudes of the signal components. In particular, it is monitored whether the magnitude of the first signal component (abs1) is smaller than 1.35 times the magnitude of the second signal component (abs2), abs1<abs2*1,35 if abs1>=abs2 or whether abs2<abs1*1,35 if abs2>abs1.

```
1    alpha = 0.35;
2    for(idx = 0; idx<number_of_signal_samples; idx++) {
3        absA = abs(A_sig[idx]);
4        absB = abs(B_sig[idx]);
5        if( (absA>0) && (absA>=absB) && (absA<(1+alpha)*absB) ) {
6            A_sig[idx] = A_sig[idx]/absA*(1+alpha/2)*(absA+
                 absB)/2;
7            B_sig[idx] = B_sig[idx]/absB*(1-alpha/2)·(absA+
                 absB)/2;}
8        else {
9            if( (absA>0)&&(absB>absA)&&(absB<(1+
                 alpha)*absA) ) {
10               A_sig[idx] = A_sig[idx]/absA*(1-alpha/2)*(absA+
                     absB)/2;
11               B_sig[idx] = B_sig[idx]/absB*(1+alpha/2)*(absA+
                     absB)/2;}
12       }
13   }
```

The example illustrated in FIG. 2 and summarized by the above code uses a ratio between the magnitudes in order to provide a measure a disparity between the first magnitude A and the second magnitude B. As indicated in lines 1, 5 and 9 of the pseudo-code, the acceptable ratio between the magnitudes of the signals as defined in lines 2 and 3 of the pseudo-code is chosen to be 1.35. This is for illustrative purposes only and other ratios may be used. In this particular example, time sets are identified where the magnitude of the signal having the presently higher magnitude is less than 1.35 times the magnitude of the other signal component in lines 5 and 9. Each time set may comprise a plurality of time intervals or samples [idx] in which the respective criterion is true. For the example of FIG. 2, this is the case for time intervals 206 and 208. Within the time intervals 206 and 208, the first and second signal components are both modified such that the first modified magnitude 212 of the first modified signal illustrated in dashed lines and the second modified magnitude 214 of the second modified signal maintain an identical distance to the mean value of the first magnitude A and the second magnitude B. This is apparent from lines 6, 7 and 10, 11 of the pseudo-code indicating the scaling or modification of the magnitudes within each of the different time sets.

In summary, the first and second signal components are modified such that a disparity between the magnitudes A and B is maintained above the threshold within the time interval in which the magnitudes of the original signal components would have a disparity below the threshold. Since the magnitudes 202 and 204 of the first and second signal components cross each other, the sign of the modification of the first and second signal components is changed at the time instant where the original magnitudes 202 and 204 cross each other. That is, the time where the modified magnitudes 212 and 214 are identical or similar to each other is decreased to the possible minimum between two subsequent sample times of FIG. 2.

In other words, FIG. 2 illustrates the magnitude of the first signal component (primary signal) and of the second signal component (secondary signal) signals plotted over a short period of time unmodified (solid line) and modified output (dashed) by an example of a method or algorithm, illustrating how the examples operate. (In this case the error signal is also filtered to reduce the ACLR (Adjacent Channel Leakage Power Ratio) degradation).

While FIGS. 1 and 2 detail a method for providing a baseband signal and one particular implementation of the same, FIG. 3 illustrates as to how the implementation of an example as described herein may increase signal characteristics of the provided baseband signal compared to conventional approaches. Generally, a combined signal having a first signal component A(t) associated to a first frequency $f_1$ and a second signal component B(t) associated to a second frequency $f_2$, may be mathematically formulated in the following form:

$$CA_{sig}(t) = A(t)e^{i\omega t} + B(t)e^{-i\omega t}$$
$$= \frac{1}{2}[(A(t) + B(t))(e^{i\omega t} + e^{-i\omega t}) + (A(t) - B(t))(e^{i\omega t} - e^{-i\omega t})]$$
$$= [A(t) + B(t)]\cos(\omega t) + i[A(t) - B(t)]\sin(\omega t)$$

Where $\omega/2\pi$ corresponds to the frequency being given by one half of the difference of the first frequency $f_1$ and the second frequency $f_2$. In other words, the resultant signal $CA_{sig}(t)$ is given in a representation symmetrical with respect to the frequencies $f_1$ and $f_2$ of the individual signal components. This could also be summarized as A(t) and B(t) being centered at DC. Depending on the bandwidth of the signal components A(t) and B(t) as compared to their spacing $\omega/2\pi$, the resultant signal $CA_{sig}(t)$ may exhibit some undesirable properties for further modulation and transmission of the combined signal. In particular, when the bandwidth of the first and second signal components A(t) and B(t) is small as compared to their spacing, this may be the case. Such signal characteristics may occur in multiple wireless transmission systems, such as for example in LTE systems using carrier aggregation, irrespective of whether systems employ intra-band contiguous, intra-band non-contiguous or inter-band carrier aggregation. As a simple example, one may assume that two adjacent LTE channels of 20 MHz bandwidth are aggregated (intra-band contiguous) and that a single radio bearer of 180 kHz bandwidth is used within each carrier. Further assuming that the allocated transmit spectrum is situated at the opposing edges of the two channels, their distance is roughly 40 MHz and, hence, $\omega/2\pi$ amounts to approximately 20 MHz. Since the bandwidth of A(t) and B(t) is small as compared to $\omega/\pi$, it can be approximated that A(t) and B(t) are constant over a small time interval. However, within the small time interval, multiple oscillations of $\sin(\omega t)$ or of $\cos(\omega t)$ occur.

Assuming that A and B are constant, the signal $CA_{sig}(t)$ corresponds to an ellipsis in the polar plane having two half axes depending on A and B. If either one of A or B is zero, the ellipsis becomes a circle. Generally, the ratio between the magnitude of the long axis and the magnitude of the short axis is a function of the ratio between the magnitude of A and the magnitude of B. If either of the two half axes is close zero, the ellipsis defined by the equation of $CA_{sig}(t)$ becomes close to a straight line and, hence, the signal $CA_{sig}(t)$ crosses the origin of the polar plane twice every cycle time $T=1/\omega$ or every period. This is equivalent to the event that the magnitude of A equals the magnitude of B. To determine a possibly undesirable shape of the ellipsis close to a straight line, it is sufficient to monitor the magnitude of the signal components A and B. Zero crossings may be undesirable since they may lead to instabilities of subsequent components within an RF transmission chain, such as for example subsequent of I/Q modulators or R/ϕ modulators used to modulate the baseband signal $CA_{sig}(t)$ onto a high frequency carrier. As given by the equation above, the ellipsis becomes a straight line once either A+B or A-B becomes zero which is equivalent to the observation that the magnitude of the first signal component A(t), i.e. the absolute value of A(t) equals or becomes close to the magnitude of the second signal component B(t).

By using an example as described herein, the first and second signal components to be combined are modified such that a disparity measure between the modified magnitudes of the modified first and second signal components is maintained above a predetermined threshold so that non-random crossings of a baseband signal $CA_{sig}(t)$ being combined using a first signal component and a second signal component are avoided.

For the previous example of LTE intra-band contiguous carrier aggregation of two 20 MHz carriers and radio bearers at their opposite sides, the spacing between the radio bearers would roughly amount to 40 MHz and hence, the combined signal $CA_{sig}(t)$ would cross the constellation origin periodically every 25 ns given that the magnitudes of the signals A and B are comparable. This would potentially decrease the signal quality of an RF signal based on the baseband signal significantly. However, using examples of methods for providing a baseband signal or baseband signal generators as described herein may provide combined baseband signals not causing a corresponding signal degradation.

As an illustration of the signal properties resulting from the previous equation for the combined signal $CA_{sig}(t)$, FIG. 3 illustrates various examples of first and second complex valued signal components A(t) and B(t), together with the resultant baseband signal in the absence of an example of a method or a baseband signal generator. FIG. 3 illustrates in the left plot pairs of first and second signal components to be combined and in the right plot the resultant combined baseband signal $CA_{sig}(t)$. The resultant combined signal $CA_{sig}(t)$ is illustrated without modifying the magnitudes of the signal components A(t) and B(t) prior to their combination. The first signal component A(t) is always given by open circles and the second signal component B(t) is given by crosses in the left plot of FIG. 3. The right plot shows the corresponding ellipsis for a much higher number of sampling points since $\omega/2\pi$ is much greater than the bandwidth of the first signal component A(t) and the second signal component B(t). As an example for the general behavior, the first signal component 302a and the second signal component 302b result with the baseband signal 302 while the first signal component 304a and the second signal component 304b result with the baseband signal 304. As illustrated in FIG. 3, for example LTE carrier uplink aggregation might result with baseband signals having undesirable characteristics, for example in that crossings of the origin of the polar plane occur in a non-random manner and in predetermined time intervals. This, in turn, might introduce spurious or undesirable noise components within the baseband signal due to the regularity of the occurrence of the additional disturbances.

Figure 4:
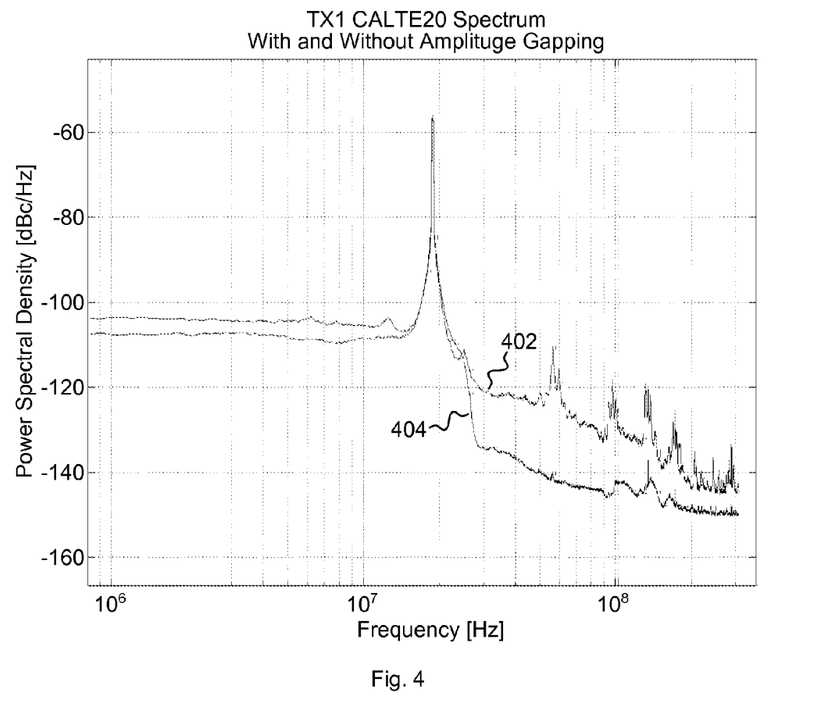
FIG. 4 illustrates a spectrum of a baseband signal of one example as compared to a baseband signal generated by a conventional approach.

By implementing a method as described with respect to FIG. 1 or an example of a baseband signal generator, the signal characteristics may be enhanced significantly, as illustrated in FIG. 4.

FIG. 4 illustrates the spectral density of the signal of a test case using LTE uplink carrier aggregation where the combination of a first signal component associated to a first frequency and of a second signal component associated to a second frequency into a combined baseband signal is performed. The plot illustrates the spectral density of the resultant baseband signal of a conventional approach compared to the resultant baseband signal of an example using a baseband signal generator as described herein. The frequency in terms of Hz is plotted on the x-axis while the y-axis of FIG. 4 illustrates the power density of the resultant baseband signals in dB. The continuous graph 402 illustrates the result for a conventional approach while the dashed graph 404 illustrates the spectral density of the same test case as achieved by an example of the baseband signal generator or by employing an example of a method as described herein.

Further, the benefits of the examples described herein may be achieved with a low energy consumption since the modification of the magnitudes of the signal components may be achieved at the low data rate of the signal components and, hence, at low sampling rates. This may serve a considerable amount of energy as compared to computations with a higher data rate, as for example the application of additional or alternative algorithms running on higher sampling rates of, for example, the baseband frequency. In other words, a method according to an example may be applied on the data sample in the beginning of the transmit digital signal processing (DSP) chain, thus consuming less current than more complex algorithms running on higher sample rates.

Figure 5:
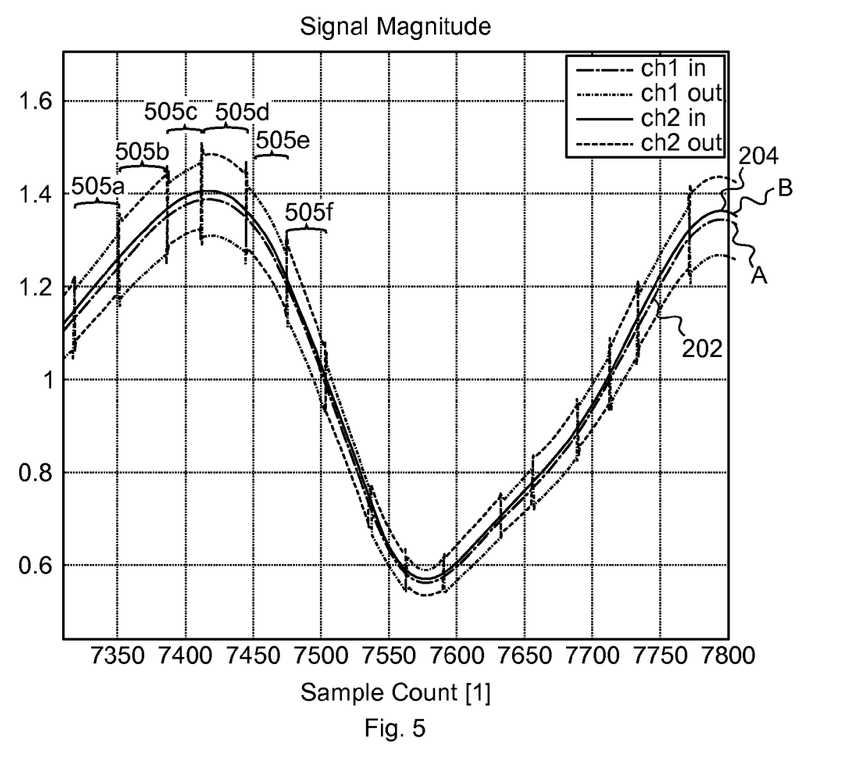
FIG. 5 illustrates a further example for a modification of a first signal component and a second signal component.

FIG. 5 illustrates a further example as to how a first magnitude of a first signal component A and a second magnitude of a second signal component B may be modified so as to avoid that the magnitudes are similar to each other over longer periods of time.

In the particular example of FIG. 5, the magnitude of the first signal component A and the magnitude of the second signal component B are similar to each other for extensive time periods. This may, for example, be the case, when the information transmitted by means of the first and second signal components is similar or even identical. One practical example is LTE carrier aggregation when the cell IDs of two aggregated cells are identical. This may, for example, be the case for some measurement channels as defined by the collaboration of the third generation partnership program (3GPP). In the example of FIG. 5, the amplitude of the first signal component 202 is increased and decreased in an alternating manner in subsequent time intervals 505a to 505f. In the first time interval 505a the magnitude A is increased while in the subsequent second time interval 505b the magnitude is decreased, and so on and so forth. The magnitude of the second signal component 204 is modified to the opposite, i.e. it is decreased within the first time interval 505a and increased in the second time interval 505b. The example as illustrated in FIG. 5 may ensure that the overall power of the first and second signal components 202 and 204 is maintained while the insertion of additional noise components or spurious in the combined signal is avoided. By subsequently adding and subtracting from the individual magnitudes, an overall power within the signal may be preserved so as to avoid misinterpretations of the signal or degradations of the signal. For example, reference symbols transmitted within LTE transmissions, e.g. in the middle of LTE slots, may have the same amplitude for the primary and secondary channels over the whole symbol. Since the channel quality is estimated by means of an evaluation of those reference symbols, a misinterpretation or misjudgment may be avoided by means of an example as illustrated in FIG. 5 in that the overall power within the channel may be maintained by subsequently adding and subtracting from the magnitude of the individual signal components.

In some examples, the subsequent time intervals for alternatingly increasing and decreasing of the individual magnitudes have unequal lengths so as to avoid to introduce additional irregularities and associated spurious or noise in the combined signal. However, for each individual signal component, a first accumulated length of the time intervals of increasing the amplitude may correspond to a second accumulated length of the time intervals of decreasing the amplitude in order to preserve the overall energy contained within the individual signal components. In other words, FIG. 5 illustrates an example where the channels or the signal components "take turns" in being magnified and shrunk when the first magnitude A of the first signal component 202 (primary channel) and the second magnitude B of the second signal component 204 (secondary channel) are close together over a significant period of time. This may be done in a way such that the average power of the two channels or signal components remain constant and that no spurious is produced. Spurious may be avoided by dithering the switching period. Switching is performed much faster than the signal symbol length and there is little degradation within the signal components or the allocated radio bearers. A degradation of the channel estimation based on the modified reference symbols is limited.

Figure 6A:
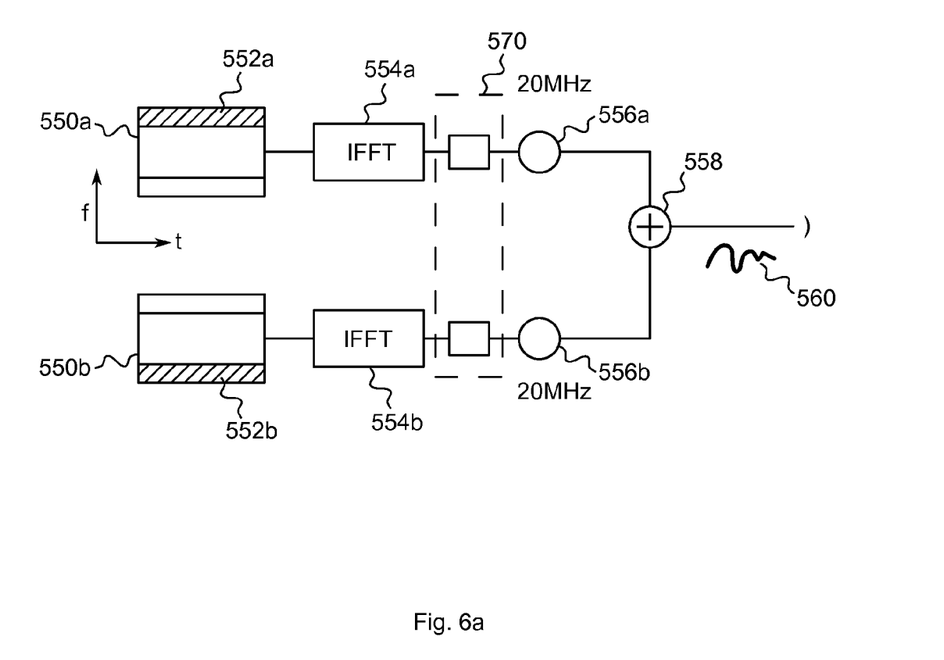
FIG. 6a illustrates an example where the magnitudes of the first signal component and the second signal component are modified in the time domain.

Some examples may perform the modification of the magnitude in the time domain. One particular example where this may be the case is schematically illustrated in FIG. 6a. FIG. 6a illustrates the use case of LTE intra band contiguous carrier aggregation serving also as an example for the numerical calculations above. In this scenario, a first carrier 550a of, for example, 20 MHz is combined with a second carrier 550b to be transmitted by means of a single Radio Frequency amplifier. It is assumed that a first resource Block (RB) 552a in the first carrier 550a is used while a second resource block within the second carrier 550b is used. The resource blocks allocated are on opposite sides of the associated carriers so that their distance amounts to roughly 40 MHz while their bandwidth is only 180 kHz. The carriers 550a and 550b are composed in the frequency domain and transformed into the time domain by a frequency to time transformations 554a and 554b, e.g. by means of an inverse fast fourier transform (IFFT). In one particular implementation, the resultant time domain signals are offset by the width of the individual carriers, i.e. by plus and minus 20 MHz, respectively, before they are combined into a baseband signal 560 by means of a signal combiner.

The baseband signal generator 570 and the modification of the amplitudes of the signal components associated to the first and second carriers 550a and 550b may be performed in the time domain after the frequency to time transformations 554a and 554b as illustrated in FIG. 6a. Alternatively, the modification may be performed in the frequency domain.

Figure 6B:
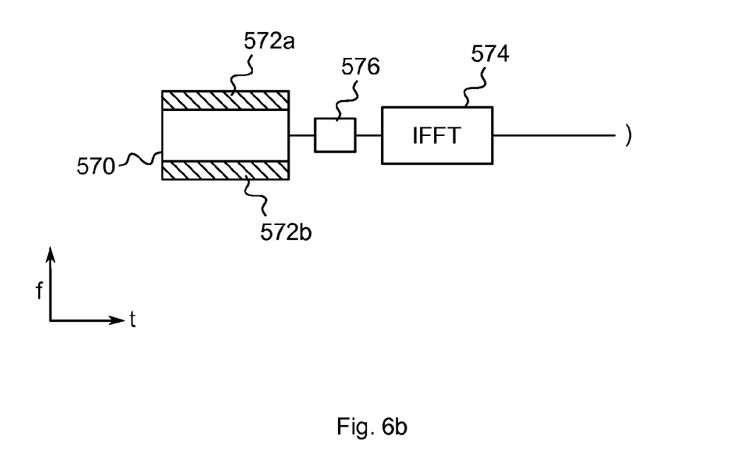
FIG. 6b illustrates an example where the magnitudes of the first signal component and the second signal component are modified in the time domain.

One particular example where the modification is performed in the frequency domain is illustrated in FIG. 6b, which also illustrates a use case of LTE uplink communication. A single carrier 570 is used in which two resource blocks 572a and 572b are allocated on opposite edges of the carrier 570. The first resource block 572a hence corresponds to a first signal component and the second resource block 572b corresponds to a second signal component. That is, the distance between the carriers amounts to roughly 20 MHz in the event of a 20 MHz carrier. When both signal components are combined by means of a frequency to time transformation 574 serving as a signal combiner, the resulting signal may exhibit the undesirable properties indicated above.

An example of a baseband signal generator 576 within the frequency domain may serve to avoid the undesirable properties by modifying at least one magnitude of the signal corresponding to the first resource block 572a or first signal component and the signal corresponding to the second resource block 572b or second signal component within the frequency domain.

Figure 7:
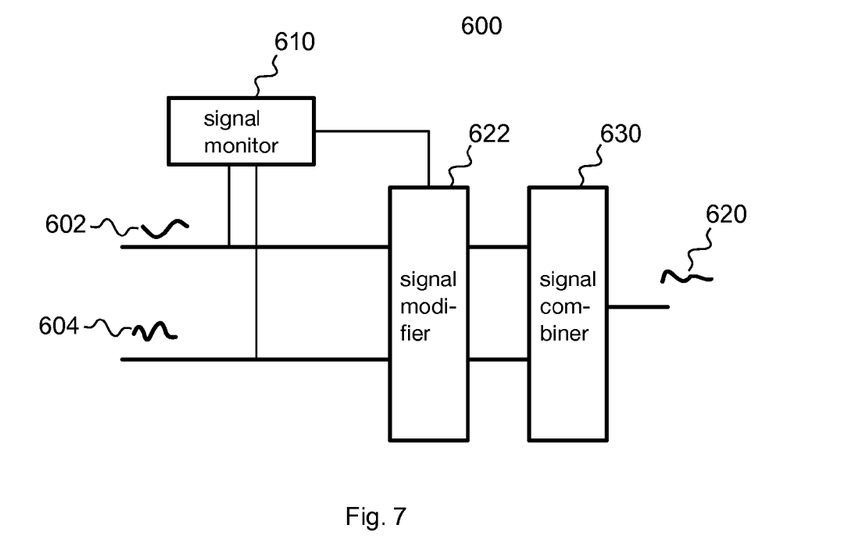
FIG. 7 schematically illustrates an example of a baseband signal generator by means of a block diagram.

FIG. 7 schematically illustrates an example of a baseband signal generator 600 by means of a block diagram. The baseband signal generator 600 is used to provide a baseband signal 620 comprising at least a first signal component associated to a first frequency and a second signal component associated to a second frequency. The signal monitor 610 is configured to monitor a disparity between a first magnitude of the first signal component 602 and a second magnitude of the second signal component 604. A signal modifier 622 is configured to modify at least one magnitude of the first magnitude and the second magnitude such that the disparity between the modified amplitudes is above the threshold. To this end, the magnitude of the first signal component 602 or the magnitude of the second signal component 604 may be modified. Further, both magnitudes of the first signal component 602 and the second signal component 604 may be modified simultaneously. A signal combiner 630 is configured to combine the first signal component and the second signal component, potentially having modified magnitudes or amplitudes in order to provide the baseband signal 620.

Figure 8:
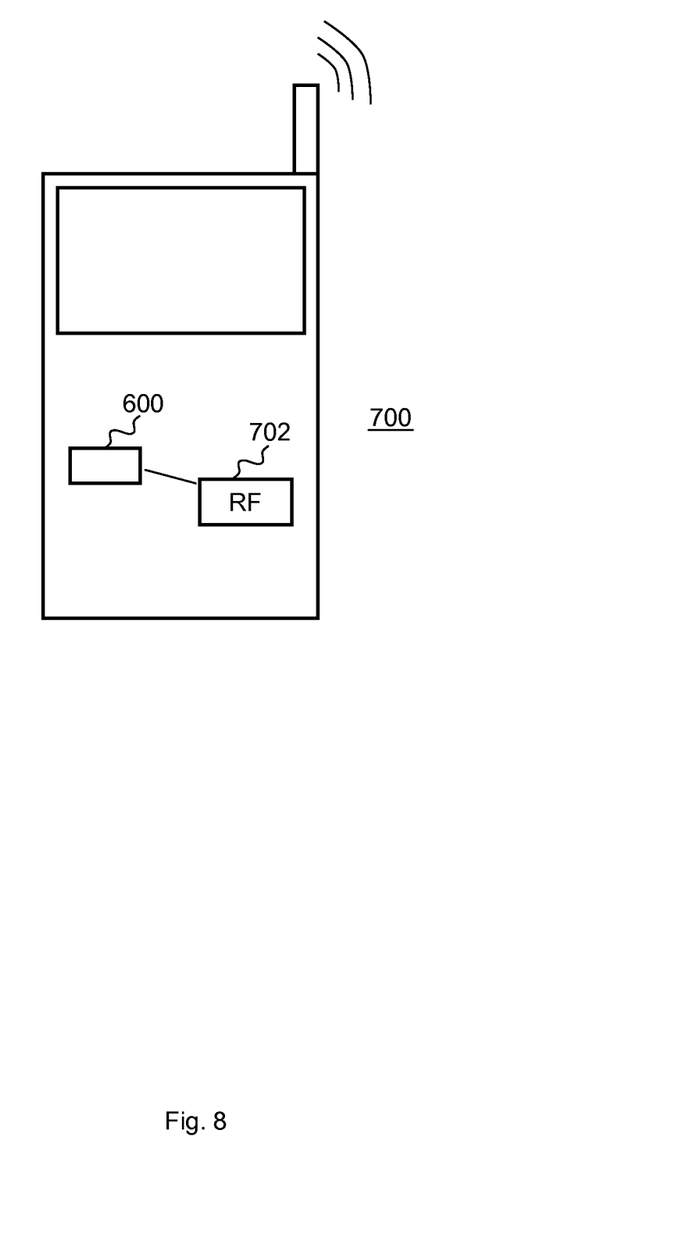
FIG. 8 illustrates an example of a mobile telecommunications device.

FIG. 8 illustrates an example of a mobile telecommunications device or a user equipment of a mobile telecommunications network 700 using a baseband signal generator according to an example as described herein. The baseband signal generator 600 may be coupled to a radio frequency modulator or amplifier 702 in order to provide a radio frequency modulated signal to be sent or transmitted by the mobile telecommunications device. Mobile telecommunication devices or user equipment 700 incorporating an example as described herein may hence be used to support various carrier aggregation scenarios of today's or future transmission architectures, as for example LTE carrier aggregation. Since the baseband signals as being provided or generated by the examples described herein avoid the introduction of additional spurious or noise components potentially disturbing neighboring frequency bands, even future applications as for example inter-band carrier aggregation may be supported even when only a single transmitter is to be used. Further examples may be included within a system or User Equipment (UE) supporting multi cluster transmissions. With multicluster transmission, a single device or UE of, for example a LTE System, may be allocated to two clusters to simultaneously transmit information to two receivers, one associated to each of the clusters. The transmission may be performed by a single transmitter and further scenarios may also support simultaneous transmission to more than two receivers.

In summarizing the above, for two narrow signal clusters separated spectrally by an amount significantly larger than the bandwidth of the individual signal clusters, periodic zero crossings of the combined signal are a result of the magnitude of the two transmit clusters if those are almost equal over a certain period of time. This could be summarized in that ABS(sig1($t$))=ABS(sig2($t$)), for (t1<t<t2). The two signal components being associated to different frequency bands may be modified individually before pulse-shaping and mixing them together so that the time where the relative difference in magnitude of the signals is within some defined range is minimized. This may, for example, be done by rescaling the signal sample-wise such that each sample individually fulfills ABS(sig1)/ABS(sig2)>α OR ABS(sig2)/ABS(sig1)>α for some threshold value of α. If ABS(sig1)=ABS(sig2) over a longer period of time, the operations sig2=β×sig1 and sig1=sig2/β and sig2=sig1/β and sig1=β×sig2 may be alternated such that the average power of the respective signals is kept at least nearly constant. By dithering the toggling operation, a spurious free modification scheme may be achieved. For some cases, the average toggling period length can be chosen such that most error energy falls outside the data bandwidth, minimizing the EVM contribution of the signal modification.

In using some examples as described herein, certain LTE uplink carrier aggregation use cases may be supported where the transmitted signal passes through the constellation origin periodically in a non-random manner when conventional approaches are used. Such periodicy and non-randomness would render spurious violating the spurious emission requirements for a transmitter using only conventional frequency limiting measures.

Using examples as described herein, the number of zero crossings may be reduced even down to zero and further frequency-limiting measures for dual cluster transmit signals being spectrally separated with a comparatively large gap with respect to the bandwidth of the signals may be alleviated. One particular use case is one single radio bearer at the edge of each channel of an LTE carrier aggregation scenario of two neighboring 20 MHz uplink LTE channels. Transmission of this kind of signals, having two narrow band signals of 180 kHz separated with almost 40 MHz from each other over a polar or I/Q transmitter is enabled without degradation of the signal quality. Even when aggregated channels carry the same cell ID providing strongly coupled reference symbols, examples as described herein support LTE carrier uplink aggregation without the introduction of additional spurious or the disturbing of neighboring channels due to inferior frequency characteristics of the generated baseband signals.

While the previous examples have mainly been illustrated and explained with respect to their possible use for a LTE mobile telecommunication system or a LTE user equipment, further examples may be implemented in arbitrary other wireless transmission systems. Examples for those systems may be another one of the 3GPP-standardized mobile communication networks or mobile communication systems. The mobile or wireless communication system may correspond to, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Interoperability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc. Further examples of receiver systems or tuning circuits may also be used in connection with other wireless communication standards or protocols, such as for example Bluetooth, ZIGBEE or the like.

Example 1 is a method for providing a baseband signal, comprising: monitoring a disparity between a first magnitude of a first signal component and a second magnitude of a second signal component; if the disparity is below a threshold, modifying the first signal component, the second signal component or a combination of the first signal component and the second signal component to provide a first modified signal component and a second modified signal component to increase the disparity between the magnitudes of the modified signal components to above the threshold; and combining the first modified signal component and the second modified signal component to provide the baseband signal.

In example 2, monitoring (102) a disparity comprises monitoring a ratio of the first magnitude and the second magnitude.

In example 3, modifying (104) the first signal component and the second signal component comprises modifying the examples 1 or 2 comprises modifying an amplitude of the first signal component and an amplitude of the second signal component by an identical amount.

In example 4, modifying (104) the first signal component, the second signal component or a combination of the first signal component and the second signal component comprises providing the first modified signal component and the second modified signal to have a first modified magnitude of the first modified signal component and a second modified magnitude of the second modified signal component having an identical distance to a mean value of the first magnitude and the second magnitude.

In example 5, only the second signal component of example 1 or 2 is modified if the first signal component has a better signal to noise ration than the second signal component.

In example 6, only the second signal component of example 1 or 2 is modified if the first signal component corresponds to a primary component carrier of an LTE baseband signal used for carrier aggregation.

In example 7 modifying (104) the first signal component, the second signal component or a combination of the first signal component and the second signal component comprises providing the first modified signal component and the second modified signal to have a first modified magnitude being bigger than a second modified magnitude for a time interval in which the disparity is below the threshold if the first magnitude is bigger than the second magnitude at the beginning of the time interval.

In example 8, modifying the first signal component, the second signal component or a combination of the first signal component and the second signal component in any of the previous examples optionally comprises alternating increasing and decreasing the amplitude of the first signal component, the second signal component or a combination of the first signal component and the second signal component within subsequent time intervals.

In example 9, the subsequent time intervals of example 8 optionally have unequal lengths.

In example 10, a first accumulated length of the time intervals of increasing the amplitude optionally corresponds to a second accumulated length of the time intervals of decreasing the amplitude in example 9.

In example 11, any of the preceding examples optionally further comprises: determining a phase of a signal oscillating with a frequency corresponding to a difference between the first frequency and the second frequency; and changing a modification scheme or beginning with the modification of the first signal component, the second signal component or a combination of the first signal component and the second signal component when the phase is within a predetermined interval.

In example 12, the modification of the first signal component, the second signal component or a combination of the first signal component and the second signal component of any of the preceding examples is optionally performed in the time domain.

In example 13, the modification of the first signal component, the second signal component or a combination of the first signal component and the second signal component of any of the preceding examples is optionally performed in the frequency domain.

In example 14, the first signal component comprises a first resource block of an LTE Uplink transmission and the second signal component comprises a second resource block of an LTE Uplink transmission optionally within any of the preceding examples.

In example 15, the first resource block and the second resource block optionally belong to a different carrier within any of the preceding examples.

In example 16, any of the preceding examples optionally further comprises modulating the baseband signal onto a radio frequency carrier.

In example 17, the first signal component is associated to a first frequency and the second signal component is associated to a second frequency.

Example 18 is a baseband signal generator for providing a baseband signal, comprising: a signal monitor configured to monitor a disparity between a first magnitude of the a signal component and a second magnitude of a second signal component; a signal modifier configured to modify, if the disparity is below a threshold, the first signal component, the second signal component or a combination of the first signal component and the second signal component to provide a first modified signal component and a second modified signal component to increase the disparity between the magnitudes of the modified signal components above the threshold; and a signal combiner configured to combine the first modified signal component and the second modified signal component to provide the baseband signal.

In Example 19, the signal modifier of the baseband signal generator 18 is configured to modify the first signal component and the second signal component by an identical amount.

Example 20 is means for providing a baseband, comprising: means for monitoring a disparity between a first magnitude of a first signal component and a second magnitude of a second signal component; means for modifying, if the disparity is below a threshold, the first signal component, the second signal component or a combination of the first signal component and the second signal component to provide a first modified signal component and a second modified signal component to increase the disparity between the magnitudes of the modified signal components to above the threshold; and means for combining the first modified signal component and the second modified signal component to provide the baseband signal.

In Example 21, the means for modifying of example 20 is configured to modify the first signal component and the second signal component by an identical amount.

Example 22 is a transmitter, comprising a baseband signal generator according to any of claim 17 or 18 to provide a baseband signal; and a modulator for modulating the baseband signal to a carrier.

In Example 23, the transmitter of example 22 is a R/φ Modulator.

Example 24 is a Mobile telecommunications device comprising a transmitter according to Example 22 or 23.

In Example 25, the Mobile telecommunications device of example 23 configured to transmit carrier aggregated LTE signals.

In Example 26, the Mobile telecommunications device of example 23 configured to perform LTE multi cluster transmissions.

Example 27 is a computer program having a program code configured to perform the method of any of examples 1 to 17, when the computer program is executed on a computer or processor.

Example 28 is a machine readable medium including code to cause a machine to perform the method of any of examples 1 to 17 if the code is executed by the machine.

Examples may further provide a computer program having a program code for performing one of the above methods, when the computer program is executed on a computer or processor. A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure are intended to encompass equivalents thereof.

Functional blocks denoted as "means for . . ." (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

What is claimed is:

1. A method for providing a baseband signal for a carrier-aggregation radio system, the method comprising:
   providing a first signal component representing a first data stream and associated with a first carrier, and a second signal component representing a second data stream and associated with a second carrier having a different frequency than the first carrier;
   comparing a first magnitude of the first signal component against a second magnitude of the second signal component to produce a disparity measure that represents a degree of variation between the first magnitude and the second magnitude;
   if the disparity measure is below a threshold, modifying the first signal component, the second signal component or a combination of the first signal component and the second signal component to provide a first modified signal component and a second modified signal component to increase the disparity measure between the magnitudes of the modified signal components to above the threshold; and
   combining the first modified signal component and the second modified signal component to provide the baseband signal.

2. The method of claim 1, wherein monitoring a disparity measure comprises monitoring a ratio of the first magnitude and the second magnitude.

3. The method of claim 1, wherein modifying a combination of the first signal component and the second signal component comprises modifying an amplitude of the first signal component and an amplitude of the second signal component by an identical amount.

4. The method of claim 3, wherein modifying the first signal component, the second signal component or a combination of the first signal component and the second signal component comprises providing the first modified signal component and the second modified signal to have a first modified magnitude and a second modified magnitude having an identical distance to a mean value of the first magnitude and the second magnitude.

5. The method of claim 1, wherein only the second signal component is modified if the first signal component has a better signal to noise ratio than the second signal component.

6. The method of claim 1, wherein only the second signal component is modified if the first signal component corresponds to a primary component carrier of an LTE baseband signal used for carrier aggregation.

7. The method of claim 1, wherein modifying the first signal component, the second signal component or a combination of the first signal component and the second signal component comprises providing the first modified signal component and the second modified signal to have a first modified magnitude being bigger than a second modified magnitude for a time interval in which the disparity measure is below the threshold, if the fist magnitude is bigger than the second magnitude at the beginning of the time interval.

8. The method of claim 1, wherein modifying the first signal component, the second signal component or a combination of the first signal component and the second signal component comprises alternating increasing and decreasing the amplitude of the first signal component, the second signal component or a combination of the first signal component and the second signal component within subsequent time intervals.

9. The method of claim 8, wherein the subsequent time intervals have unequal lengths and, wherein a first accumulated length of the time intervals of increasing the amplitude corresponds to a second accumulated length of the time intervals of decreasing the amplitude.

10. The method of claim 1, wherein the first signal component comprises a first resource block of an LTE Uplink transmission and wherein the second signal component comprises a second resource block of an LTE Uplink transmission.

11. A baseband signal generator for providing a baseband signal in a carrier-aggregation radio system, the baseband signal generator comprising:
    a signal monitor configured to obtain a first signal component representing a first data stream and associated with a first carrier, and a second signal component representing a second data stream and associated with a second carrier having a different frequency than the first carrier; the signal monitor further configured to compare a first magnitude of the first signal component against a second magnitude of the second signal component to produce a disparity measure that represents a degree of variation between the first magnitude and the second magnitude;
    a signal modifier configured to modify, if the disparity measure is below a threshold, the first signal component, the second signal component or the first signal component and the second signal component to provide a first modified signal component and a second modified signal component to increase the disparity measure between the magnitudes of the modified signal components above the threshold; and
    a signal combiner configured to combine the first modified signal component and the second modified signal component to provide the baseband signal.

12. The baseband signal generator of claim 11, wherein the signal modifier is configured to modify the first signal component and the second signal component by an identical amount.

13. The baseband signal generator of claim 11, wherein the baseband signal generator is part of a transmitter that includes a modulator for modulating the baseband signal to a carrier.

14. The baseband signal generator of claim 13, wherein the modulator is an R/ϕ Modulator.

15. The baseband signal generator of claim 13 wherein the transmitter is part of a mobile telecommunications device.

16. The baseband signal generator of claim 15 wherein the mobile telecommunications device is configured to transmit carrier aggregated LTE signals.

17. The baseband signal generator of claim 16 wherein the mobile telecommunications device configured to perform LTE multi cluster transmissions.

18. A non-transitory computer-readable storage medium that stores instructions for execution by one or more processors of a wireless communication device to configure the device to perform operations to provide a baseband signal in a carrier-aggregation radio system, the operations to configure the wireless communication device to:

obtain a first signal component representing a first data stream and associated with a first carrier, and a second signal component representing a second data stream and associated with a second carrier having a different frequency than the first carrier;

compare a first magnitude of the first signal component against a second magnitude of the second signal component to produce a disparity measure that represents a degree of variation between the first magnitude and the second magnitude;

if the disparity measure is below a threshold, modify the first signal component, the second signal component or a combination of the first signal component and the second signal component to provide a first modified signal component and a second modified signal component to increase the disparity measure between the magnitudes of the modified signal components to above the threshold; and combine the first modified signal component and the second modified signal component to provide the baseband signal.

* * * * *